United States Patent [19]

Freeman

[11] 4,245,545
[45] Jan. 20, 1981

[54] BLIND-END CONNECTOR FOR FASTENING SHEET METAL TO FIBER-BOARD DUCTS

[76] Inventor: James D. Freeman, 11 W. Grand Ct., Springfield, Ill. 62704

[21] Appl. No.: 7,228

[22] Filed: Jan. 26, 1979

[51] Int. Cl.³ .............................. F16B 13/08
[52] U.S. Cl. ........................ 411/342; 411/29
[58] Field of Search .......... 85/3 S, 3 R, 3 K, 80, 85/81, 5 E, 5 M, 68, 7; 24/211 P, 212; 405/259

[56] References Cited
U.S. PATENT DOCUMENTS

| | | | |
|---|---|---|---|
| 1,159,420 | 11/1915 | Rubly | 85/3 R |
| 2,911,859 | 11/1959 | Longley et al. | 85/3 R X |
| 3,001,252 | 9/1961 | Erickson et al. | 24/211 P X |
| 3,238,835 | 3/1966 | Rosenberg | 85/7 |
| 3,315,558 | 4/1967 | Fischer | 85/80 |
| 3,316,796 | 5/1967 | Young | 85/68 |
| 3,659,449 | 5/1972 | Abernathy | 85/68 UX |
| 3,671,061 | 6/1972 | Dawdy | 85/68 X |
| 3,942,240 | 3/1976 | Gebelius | 85/68 X |
| 3,959,853 | 6/1976 | Talan | 85/80 X |
| 4,010,788 | 3/1977 | Gompel | 151/2 A |

Primary Examiner—Ramon S. Britts
Attorney, Agent, or Firm—Ralph F. Staubly

[57] ABSTRACT

A toggle-bolt-like blind-end connector fastens sheet-metal panels to fiber-board ducts by passing through pre-bored holes in the metal panel and punching its own hole in the fiber-board by a sharply pointed conical head mounted on a barbed-ring shaft. An expandable spider is fixed at the base of the head and is held collapsed against the shaft by a short sleeve. The sleeve has an end flange to limit its following the head and spider through the hole punched in the fiber-board, thus allowing the spider to expand inside the duct, after which expansion the shaft is pulled outwardly to press the expanded spider against the inner surface of the fiber-board. Next a resilient-material nut having shaft-gripping barbed-rings in its bore is pushed onto the exposed end of the shaft to engage the sheet-metal panel. The barbed-rings on the shaft facilitate breaking-off the unneeded end of the shaft.

9 Claims, 12 Drawing Figures

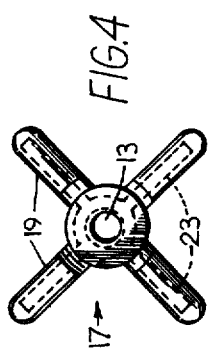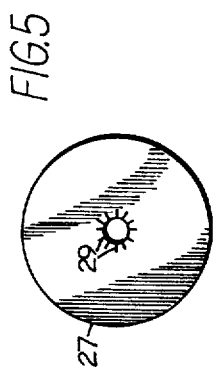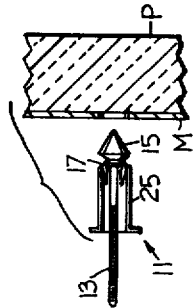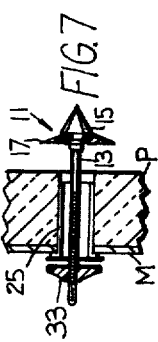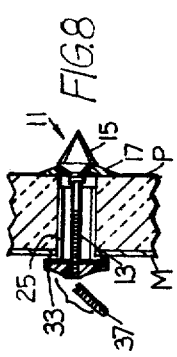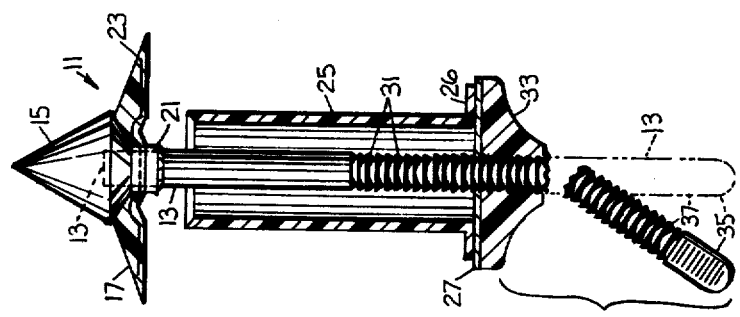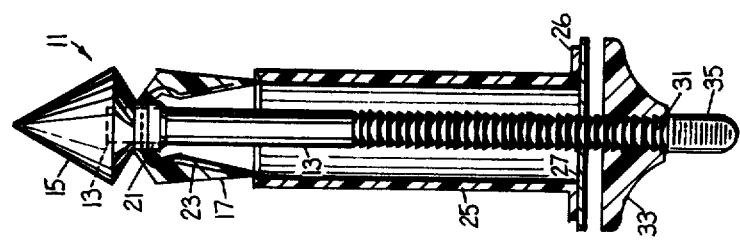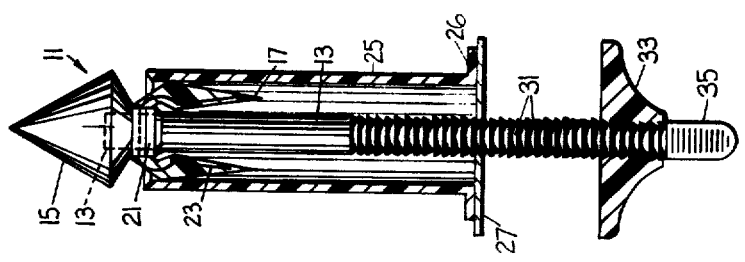

BLIND-END CONNECTOR FOR FASTENING SHEET METAL TO FIBER-BOARD DUCTS

BACKGROUND AND OBJECTS OF THE INVENTION

Blind-end toggle-bolt-type fasteners for attaching pre-bored objects to fiber-board panels are known (e.g. Gelpcke, U.S. Pat. No. 2,398,220, Apr. 9, 1946, and Passer U.S. Pat. No. 3,241,420, Mar. 22, 1966). But none is known to have a sharply pointed tapered head large enough to punch its own hole in the fiber-board panel. It is the principal object of this invention to provide such a fastener. Other objects and advantages will appear as the following specification proceeds.

BRIEF DESCRIPTIONS OF THE DRAWINGS

FIG. 1 is a plan view partly in axial section of a preferred embodiment of the invention.

FIG. 2 is a view like FIG. 1 but showing the sleeve moved almost to its spider-releasing position.

FIG. 3 is a view like FIGS. 1 and 2 but showing the fastener parts in their final operative positions.

FIG. 4 is a plan view of the embedded-spring species of the expandable spider.

FIG. 5 is a plan view of a tube-positioning washer.

FIG. 6 is a schematic plan view partly in axial section showing the first assembly step.

FIG. 7 is a view like FIG. 6 showing the second assembly step.

FIG. 8 is a view like FIGS. 6 and 7 showing the final assembly step detailed in FIG. 3.

DETAILED DESCRIPTION

Figure 12:
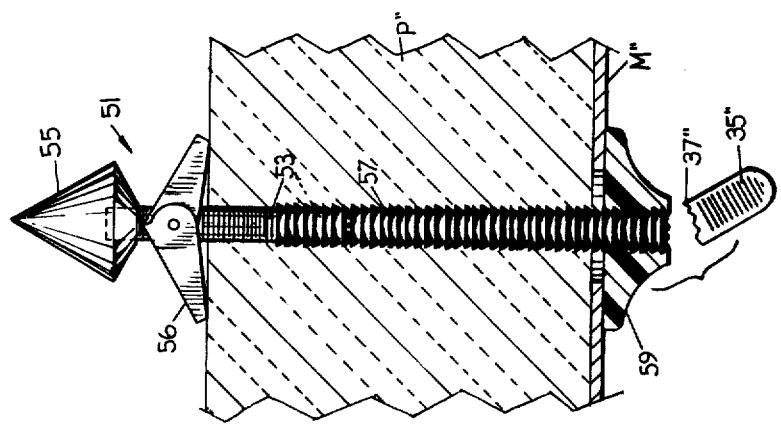
FIG. 12 is a view like FIG. 11 but showing the fastener parts in their final operative positions.

With reference now to FIGS. 1-8 of the drawings, the numeral 11 generally designates the fastener, which has a core structure formed of a plastic axial rod 13 with a molded-on or fastened-on enlarged conical sharply pointed hole-punching head 15. A flexibly expandable molded plastic spider 17 with 2, 3, 4 or more legs 19 is fixed on the rod or shaft 13 against the rear surface of the head 15 by a small pressed-on sleeve or nut 21. The spider 17 can possess sufficient springiness to insure its expansion when released, but it is herein shown as having embedded therein a thin steel spring spider 23 (FIG. 4) for surer expanding.

A plastic sleeve 25 having an outer diameter equal to that of the head 15 surrounds the shaft 13 and holds the spider 17 in its collapsed condition of FIGS. 1 and 2. Its length is somewhat less than the thickness of the fiber-board panel P (FIGS. 6-8). A press-on washer 27 (FIG. 5) radially notched around its shaft-receiving central aperture to form spring fingers 29 temporarily holds the parts of the fastener assembled by engaging into circular barb-like grooves 31 molded into the shaft 13. The grooves 31 also provide retaining threadlike means for mating with like barb-like rings molded in the bore of a press-on nut 33 which is made of resilient plastic material. The free end of the shaft 13 may be provided with a flattened and knurled tip 35 to facilitate handling and breaking-off the unneeded end 37 of the shaft 13 after the fastener is installed (FIGS. 3 and 8).

The sleeve 25 and its retainer washer 27 can be left in place or be removed before the nut 33 is slid to its final position of FIGS. 3 and 8. FIGS. 6-8 show the three successive assembling steps with the sleeve and washer left in place.

Figure 10:
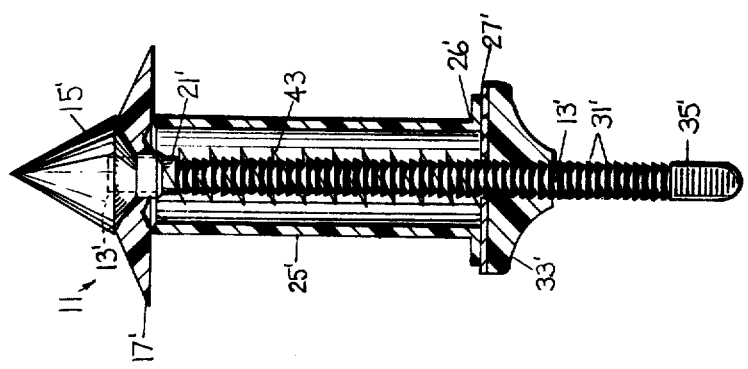
FIG. 10 is a view like FIG. 9 but showing the fastener parts in their final operative positions.
Figure 9:
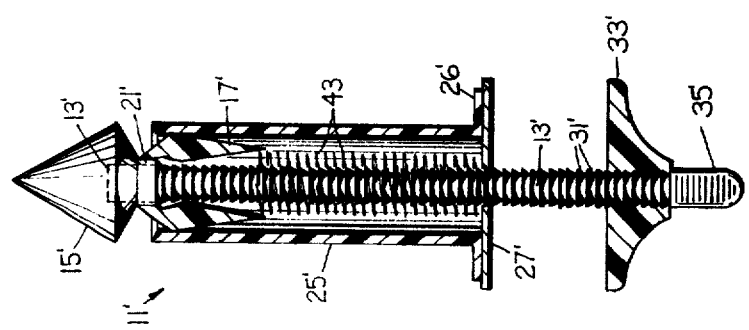
FIG. 9 is a plan view partly in axial section of a second embodiment of the invention.

FIGS. 9 and 10 disclose a second species of the fastener, which differs from that of FIGS. 1-8 primarily (1) in the omission of the spring embedded in the spider 41, and (2) in substituting for the omitted spring a compressed coil-spring 43. The other parts of the species of FIGS. 9 and 10 which correspond to like parts in FIGS. 1-3 are designated by the same numerals primed.

Figure 11:
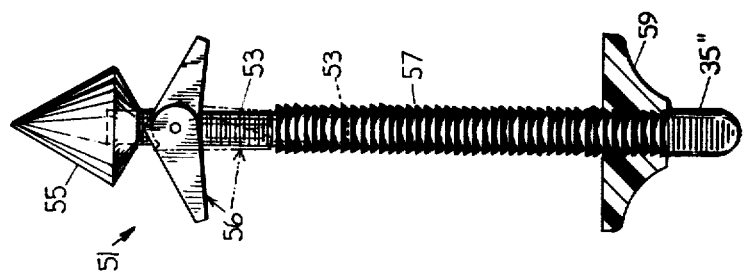
FIG. 11 is a plan view partly in axial section of a third embodiment of the invention.

In the third species of FIGS. 11 and 12, the fastener 51 has a short threaded metallic rod 53 to one end of which a hole-punching plastic head 55 is attached. A toggle-bolt-type two-arm spring-expandable anchoring member 56 (of known construction) is positioned on the metallic rod 53 as shown. The other end of the short metallic rod 53 is embedded in a barbed-ring plastic shaft 57 similar to the shaft 13 of FIGS. 1-3. A press-on resilient nut 59 like nut 33 of FIGS. 1-3 completes this third species, in which double-primed numerals indicate parts comparable to parts designated by the same unprimed numerals in FIGS. 1-6.

The invention having been described, what is claimed is:

1. A hole-punching blind-end fastener for attaching pre-bored hard-material panels or the like to soft-material panels, comprising: a rigid shaft; a sharply pointed tapered head fixed to one end of said shaft, said head having a base diameter approximating that of a pre-bored hole in a hard-material panel or like structure; a spider-like expandable member co-axially fixed immovably to said shaft closely behind said head, said expandable member being collapsible against said shaft so as to be insertable through a head-punched hole in, and so as to be expandable on the hidden side of, said soft-material panel, said shaft having spaced barb-like circular threads formed in its surface; and a press-on nut formed of resilient material and having barb-like threads for mating with the threads on the free end of said shaft.

2. A combination according to claim 1 wherein said spider-like member is formed of flexible plastic material and has at least three legs.

3. A combination according to claim 2 wherein said spider-like member has a similarly shaped spring member embedded therein.

4. A combination according to claim 2 and additionally comprising a sleeve for holding and spider-like member collapsed against said shaft and optionally removable or retainable as a liner in said head-punched hole, said sleeve having a peripheral flange for arresting its hole penetration.

5. A combination according to claim 4 and additionally comprising a washer having a radially notched center aperture for springably releasably engaging said shaft adjacent the flanged end of said sleeve to hold it in collapsing position relative to said spider-like member.

6. A combination according to claim 5 and additionally comprising a coil spring compressed between the under surfaces of said collapsed spider-like member and said washer for urging said spider-like member to expand when released from said sleeve.

7. A combination according to claim 1 wherein the unneeded end of said shaft is made easily broken-off by the depth of the grooves defining said barb-like circular threads.

8. A combination according to claim 1 wherein the free end of said shaft is flattened and knurled to provide a finger-grip portion to facilitate both fastener installation and also breaking-off the unneeded shaft end.

9. A combination according to claim 1 wherein said spider-like member comprises two toggle-bolt-type spring-expandable legs mounted on a threaded metallic shaft portion, the end of said metallic shaft portion opposite said head being embedded in one end of a molded plastic extension of said shaft, which shaft extension has said barb-like circular threads formed therein.

* * * * *